United States Patent [19]
Zillman et al.

[11] 3,933,135
[45] Jan. 20, 1976

[54] ELECTRONIC CONTROLLED MANIFOLD INJECTION SYSTEM

[76] Inventors: Jack H. Zillman, 30798 Calle Chueca, San Juan Capistrano, Calif. 92675; William I. Ballentine, Jr., 103 Paseo Laredo N, Cathedral City, Calif. 92234

[22] Filed: May 1, 1974

[21] Appl. No.: 465,732

[52] U.S. Cl. ...... 123/32 EA; 123/122 H; 123/122 F; 123/32 H
[51] Int. Cl.² .................. F02B 3/00; F02M 31/00
[58] Field of Search ........ 123/32 CA, 32 AC, 32 H, 123/122 E, 122 F

[56] References Cited
UNITED STATES PATENTS

| | | | |
|---|---|---|---|
| 3,128,603 | 4/1964 | Haigh | 123/32 CA |
| 3,470,858 | 10/1969 | Mycroft | 123/119 R |
| 3,643,635 | 2/1972 | Milam | 123/32 |
| 3,724,435 | 4/1973 | Bier | 123/139 E |
| 3,762,378 | 10/1973 | Bitowti | 123/32 |
| 3,817,225 | 6/1974 | Priegel | 123/90.12 |

*Primary Examiner*—Charles J. Myhre
*Assistant Examiner*—Ronald B. Cox
*Attorney, Agent, or Firm*—Keith D. Beecher

[57] ABSTRACT

This invention concerns an electronic controlled manifold injection system for internal combustion engines which provides a completely symmetrical flow of the air/fuel mixture to both ends of the engine, vaporizes the fuel by the application of heat to provide identical air/fuel charges to all cylinders of the engine, and by utilizing mass flow sensors in both the flow of air into the engine and the flow of fuel from the injection pump, provides a solid state control of the injection pump delivery to maintain a constant or programmed air/fuel ratio for all accelerating, decelerating and steady state operation of the engine.

8 Claims, 5 Drawing Figures

ELECTRONIC CONTROLLED MANIFOLD INJECTION SYSTEM

BACKGROUND OF THE INVENTION

Modern internal combustion engines, equipped with carburetors, rely for the supply of fuel to the cylinders upon vacuum and air flow past a series of jets from which fuel is drawn in droplets, mixed with the incoming air and drawn into the individual cylinders. The overall air/fuel ratio is set to provide the cylinder with the leanest mixture a sufficient air/fuel ratio to secure ignition. This requirement forces some of the cylinders to operate on much richer mixtures, which results in poor combustion efficiencies in these fuel rich cylinders. In addition, manifold vacuum, which to a major extent governs the amount of fuel drawn into the engine, behaves in a manner opposed to the fuel requirements of the engine. During acceleration, manifold vacuum decreases causing less fuel to be drawn into the engine, while at the same time lowering the dew point of the air/fuel mixture in the manifold and causing the precipitatiin of some of the fuel droplets from the mixture, the amount of droplets leaving the mixture being somewhat dependent upon the distance from the venturi section of the carburetor to the cylinders. This phenomenon requires the presence of an accelerating pump to supply fuel to the engine in order to overcome the defficiency of the supply of fuel. Upon deceleration, the manifold vacuum rapidly increases, drawing an excess of fuel into the intake manifold and causing an extra-rich mixture. Even at steady state engine speed operation, mixture ratios vary, especially with engine load changes, and non-uniform mixtures from cylinder to cylinder exist due to the behavior of gas and liquid mixtures and the impossibility of uniformly maintaining them during the transport from one end of the intake manifold to the other.

The teachings of our invention provide means for correcting all of these conditions which cause excessive fuel consumption and the discharge of exhaust pollutants to the atmosphere. In this electronic controlled manifold injection system, the amount of fuel delivered to the engine under all under all operating conditions is determined by the speed and delivery of the positive displacement fuel pump. The speed of this pump is controlled at all operating conditions of the engine by sensing the weight of the air being drawn into the engine and the weight of the fuel being delivered by the fuel pump, and by varying the speed and hence the fuel delivery from the pump until the weight of the delivered fuel is at the pre-determined ratio to the weight of the air. The only fuel to enter the engine is that forced into it by this injection pump. Therefore, variations in manifold vacuum, engine speed and other variables such as temperature, humidity and atmospheric pressure are all compensated for by making the supply of fuel controlled by the weight of air entering the engine.

The art of raising liquid fuel to a temperature level, thereby causing it to substantially reach its distillation point, or vaporize, when it is introduced to a partial vacuum, is well known. Several patents involving this principle have been granted in the past, and the principle is now a part of public domain. It is also a well known fact that a gas and gas mixture has a chance of being a better, more stable mixture than that of a liquid and a gas. Some of the past carburetor designs have attempted to take advantage of air and vaporized fuel mixtures in internal combustion engines in which the air and the fuel are mixed just prior to their entrance to the intake manifold and transported as a mixture to the cylinders. These devices were conceived to deliver superior mixture of the air and fuel, and thereby provide enhanced distribution characteristics of the mixture to all of the cylinders of the engine, but they lacked a means for accurately controlling temperatures of the liquid or gaseous fuel and for accurately controlling the ratio of air to fuel. A few patents disclosed the use of exhaust gases for heating the fuel, and others utilized hot water from the cooling system or battery power from the electrical system to heat the fuel electrically. Each of these systems suffered from various disadvantages such as the time required to raise the fuel to its required temperature, a difficulty of controlling the necessary range of temperature of the fuel and, in the case of the electric heater, a problem of consuming large wattages, placing hardships on components of the electrical system. The subject invention utilizes either of two methods provided to heat the fuel. These methods are, (1) exhaust gases and electrical power through a heat exchanger or (2) hot water from the cooling system and electrical power through a heat exchanger; with either the hot exhaust gas or hot water being used to raise substantially the temperature of the fuel and the electrical heater being used incrementally to add temperature in smaller quantity but sufficiently to control the required temperature of the hot, liquid fuel. The ultimate temperature of the fuel is controlled by a solid state proportional electronic circuit, which is hooked up to the heating element of the electric heater.

The concept of using electronics to control temperature and, especially, air/fuel ratio in the subject invention was selected because of the inherent accuracies obtainable by using this method of control. In addition, an important feature of symmetrical conditions of air and fuel flow from the centrally located manifold injector is obtained by providing two counter-rotating intake air throttles with the fuel injection tube located below the twin throttles.

SUMMARY OF THE INVENTION

It is a primary object of this invention to provide a novel manifold injection system for internal combustion engines in which the amount of fuel supplied to the engine is directly controlled by the weight of the air entering the engine and the ratio of the air to the fuel being held closely to a predetermined value for all operating conditions of the engine.

Still another object of this invention is to provide an electronic apparatus to modify the delivery of fuel from the injection pump in accordance with the mass flow of air entering the engine.

Another object of this invention is to provide a device for admitting air and fuel to an internal combustion engine in a substantially symmetrical flow pattern relative to cylinders located fore and aft of the centrally located injection system.

Yet another object of this invention is to provide a means for controlling the temperature of the fuel vapor being admitted to the engine.

Another object of this invention is to provide a device which varies the amount of fuel admitted to the engine in proportion to the angular position of the throttle valve, or throttle valves, such amounts being pre-determined to give proper air/fuel ratios for idling and for steady state operation at all speeds and to vary automatically these pre-determined amounts of air and fuel for all other operating conditions.

Yet another object of this invention is to provide a fuel heater which contains a sufficient amount of vaporized fuel to provide for rapid increases in fuel demand due to acceleration and its attendant instantaneous increase in the weight of air inducted at the instant of acceleration.

Another object of this invention is to provide for means for manually adjusting air/fuel ratio and idling speeds from the driver's compartment of a vehicle.

An additional object of this invention is to provide an apparatus which can replace a carburetor on an internal combustion engine economically and which will substantially decrease fuel consumption and greatly reduce atmospheric pollution caused by incomplete and inefficient fuel combustion.

The foregoing and other objects will be in part apparent and in part specifically described and claimed with the description of the following drawings.

DESCRIPTION OF THE INVENTION

Figure 1:
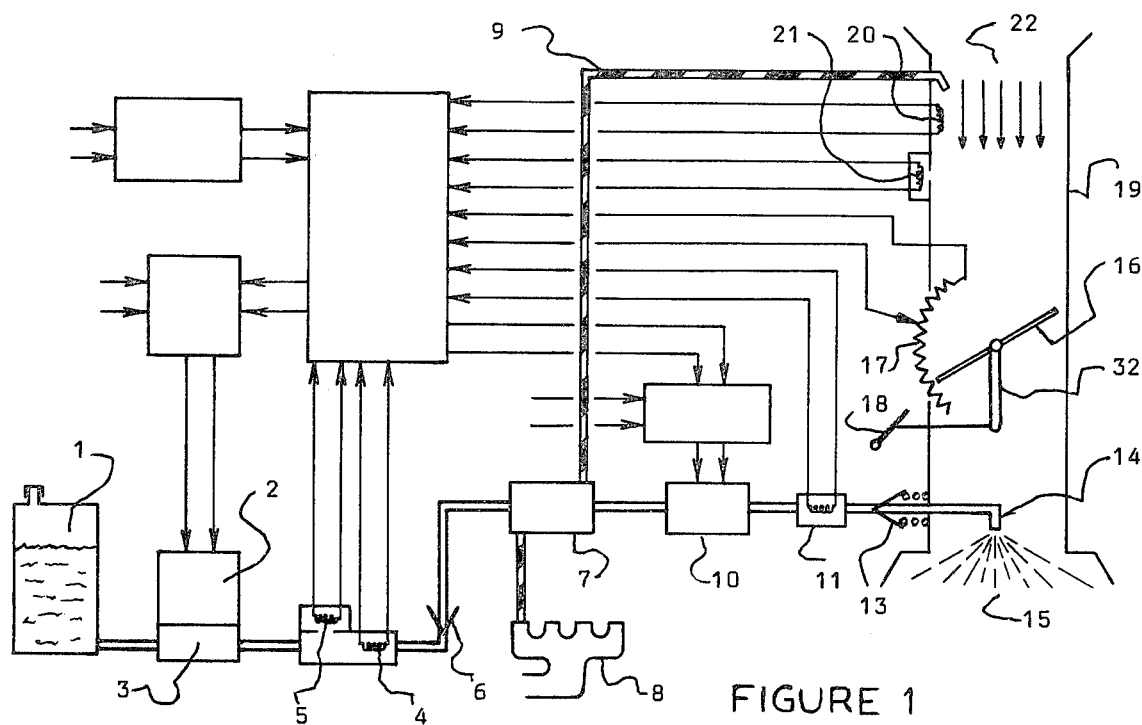
FIG. 1 is a block diagram depicting the principal components of the invention and their relationships as would be utilized in an automotive vehicle or a stationary engine.

Referring now to FIG. 1, the operation of the fuel injection system is initiated by depressing the accelerator pedal, 18. This displaces the twin throttle valves, 16, and the interconnected rheostat, 17, which mainly controls the voltage at the fuel pump electric motor, 2. The motor controls the speed of the fuel pump, 3, and therefore its delivery of liquid fuel.

Figure 4:
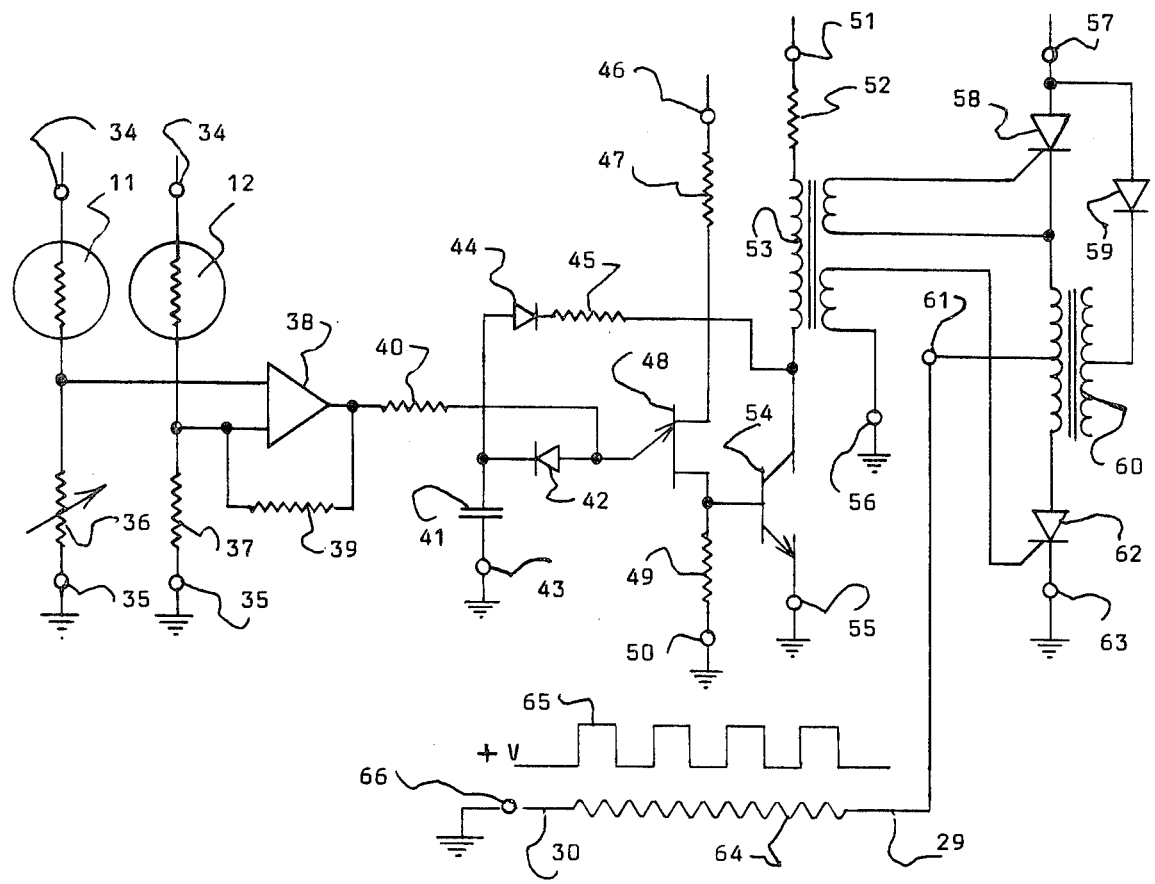
FIG. 4 is a schematic diagram of the electronically controlled fuel temperature system and FIG. 5 is a schematic diagram of the electronically controlled air/fuel ratio system.
Figure 5:
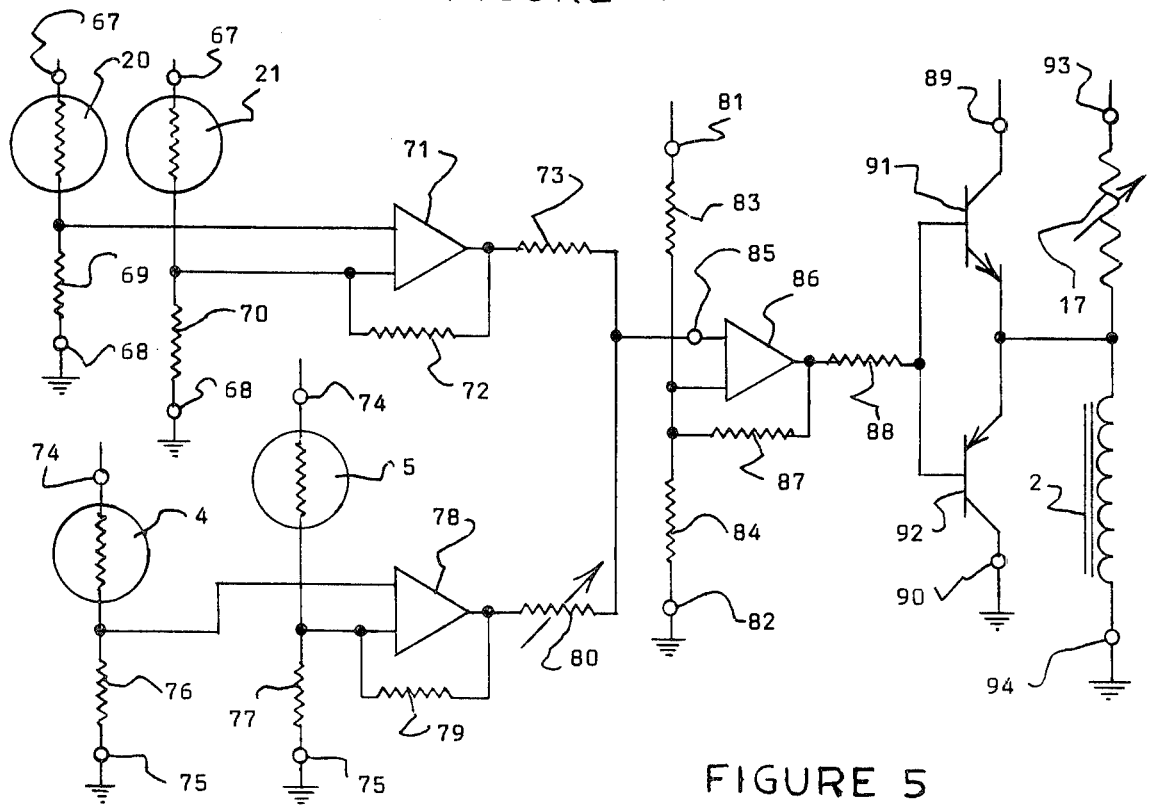

Air enters the manifold injector, 19, and flows over the air flow sensor transducer, 20, an electronic component which is sensitive to flow, temperature, humidity and atmospheric pressure, thus sensing mass flow of the fluid medium flowing over it. Such a transducer may be a thermistor, thermocouple or other type of sensor whose sensing element is excited by an electrical source. Referring to FIGS. 4 and 5, the transducers used are of the hot-wire type, and are excited by a low voltage source through terminals, 34, 67 and 74 and are connected to ground through terminals, 35, 68 and 75. An electrical current is thus provided to the sensing element of the transducer. This current is affected by changes of velocity of the medium flowing over it and by changes in temperature, humidity and atmospheric pressure around the transducer. These changes reduce, or increase, the values of electrical current in the sensing element and can be used as error signals in the electronic circuitry, FIGS. 4 and 5.

Air flow reference transducer, 21, and fuel flow reference transducer, 5, are placed in their respective environments to be neutrally affected with respect to the flow sensor by changes in temperature, humidity and atmospheric pressure; they act as cancelling members to all characteristics except for flow in the sensor bridges as shown in FIGS. 4 and 5. The air flow transducers form this bridge together with resistors, 69 and 70, to provide an electrical signal proportional to air flow weight to an amplifier, 71. A feed-back control resistor, 72, is placed across the amplifier to stabilize the amplifier's output signal to the resistor, 73, which is a component whose voltage is to compare with the potentiometer, 80, for purposes of establishing a value of air/fuel ratio. The ratios of the voltages of the outputs at the resistor, 73, and the potentiometer, 80, will be proportional to the flow of air and fuel, and thus becomes the primary control medium for the fuel system.

Referring back to FIG. 1, fuel is pumped from the fuel tank, 1, by means of the pump, 3, over a fuel flow sensor, 4 and fuel reference transducer, 5. These transducers, which are similar to the air flow transducers, 20 and 21, with two resistors, 76 and 77, form a bridge to provide an electrical signal proportional to fuel flow, said signal being directed to an amplifier, 78, with a feed-back control resistor, 79, which is for purpose of stabilizing the output of the amplifier, 78. Similar to the air flow sensor bridge, the fuel flow bridge is hooked up between the low voltage source through terminals, 74, and ground through terminals, 75. The potentiometer, 80, adjusts the air/fuel ratio by reducing or passing increased signal strength to the input terminal, 85, of the amplifier, 86, with respect to the signal level output of resistor, 73. When the electrical signal values of resistor, 73, and potentiometer, 80, are equal and come to a balanced, or null, condition, at terminal, 85, the air/fuel ratio is fixed according to the value set at potentiometer, 80, and the response rate of the system is designed to provide a constant air/fuel ratio at all conditions of speed and load of the engine. Upon upward or downward excursions of the speed or load of the engine, the voltage at terminal, 85, changes momentarily in either plus or minus quantity, causing the amplifier, 86, to draw or to reduce voltage from the low voltage source through terminal, 81, through the voltage dividing network resistors, 83 and 84, connected to ground through terminal, 82. The amplifier, 86, output voltage is stabilized by a feed-back control resistor, 87, and the voltage, or signal, increase or decrease is directed to a current limiting resistor, 88. The voltage now enters a transistor switching network, composed of transistors, 91 and 92, and, depending upon the increasing or decreasing values of signal voltage from the amplifier, 86, either of the two transistors will latch, as a relay. In the event that the voltage from the amplifier, 86, increases as a result of the voltage from amplifier, 78, decreasing, transistor, 91, will latch, causing voltage to flow from the power source, automobile battery, through terminal, 89, and on through to the motor, 2, and on to ground through terminal, 94. Conversely, if the voltage from amplifier, 78, increases, as a result of a sudden reduction of fuel flow across the transducer, 4, with respect to the weight of air flow across the transducer, 20, the voltage from amplifier, 86, will momentarily reduce, causing the transistor, 92, to latch, and power will be diverted from the motor, 2, by the closed circuit from the battery through the terminal, 93, and through the transistor, 92, and then to ground through terminal, 90. Changes of air flow, due to throttle setting changes, cause the voltage at amplifier, 71, to increase or decrease, according to the velocity, or weight, of air flow through the manifold injector, 19. These voltage changes are compensated for by the sudden appearance of differential voltage at terminal, 85, and more or less fuel flow is supplied to bring the signal voltage at terminal, 85, to equilibrium.

The input voltage from the transistor network, 91 and 92, to the electric motor, 2, is designed to provide a portion of the total power required by the motor. The rheostat, 17, will control a major portion of the power required by the motor; for example, 80 percent, while the transistor network, 91 and 92, would supply the remainder, 20 percent. The 20 percent would thus be used for trimming accurately the relationships of air and fuel to provide a constant air/fuel ratio, by means of utilizing the trimming effect or closely controlled voltage to the motor, 2.

Figure 2:
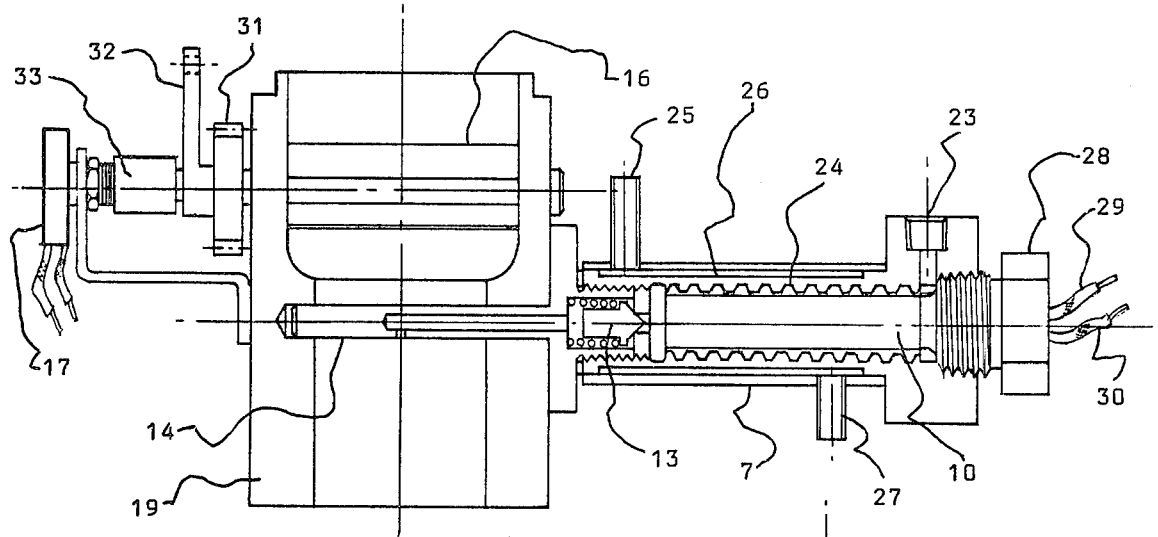
FIG. 2 is a section through the principal components of the injector.

Referring again to FIG. 1, fuel then flows through a check valve, 6, through an inlet port, 23, now referring to FIG. 2, into a combination heater, 7, through annuli, 24, and to the spring loaded valve, 13. The fuel is principally heated by gases from the exhaust gas manifold, 8, FIG. 1, whose exhaust gases are drawn by way of a duct 9 through the inlet port, 25, then pass through the annulus area, 26, and then are exhausted through port, 27, into the air intake section, 22, or into the vacuum side 15 of the manifold injector, 19. The fuel is additionally heated and the ultimate, desired temperature of the fuel is controlled by the electrical heater, 10, whose assembly is installed by means of the fitting, 28, and whose electrical conductors, 29 and 30, are connected to, referring now to FIG. 4, the power terminal, 61, and to ground through terminal, 66.

The hot gas heater, that is, the exhaust gas portion of the combination heater, becomes effective soon after the engine is started, and it is implemented to provide for a large percentage of the heat required to vaporize the fuel, thus saving electrical power required to operate the heater, 10, which is in combination with the hot gas heater, 7. The presence of the exhaust gas heater also saves wear on the important electrical components, such as the alternator/generator, voltage regulator, battery, etc.

At the discharge side of the electric heater, 10, which heats the fuel as it passes through the annuli, 24, a temperature sensing transducer 11, referring now to FIGS. 1 and 4, and a temperature reference transducer, 12, form two elements of a bridge which includes variable resistor, 36, and fixed resistor, 37, with their respective terminations, 34, coupled to a low voltage source, and terminations, 35, coupled to ground. The transducer, 11, detects changes in fuel temperature with respect to a pre-set value of fuel temperature; the value is arranged to be at mid-point of a temperature range which is required for optimum combustion efficiency. Experiments have proven that a temperature range of 30° F causes combustion to be of optimum character, and the temperature controller's parameters will be designed to be compliant with the required temperature range.

As temperature changes occur in the fuel, the bridge, components, 11, 12, 36 and 37, produce a voltage increase or decrease, depending upon the direction of change, to the amplifier, 38, with the control feed-back resistor, 39. The transducers operate similar to the transducers used in the air and fuel flow bridges, and are excited from a low voltage source. The design point of the temperature to produce optimum combustion is set by the potentiometer, 36. Resistor, 40, and capacitor, 41, form a network to increase or decrease charging rate of the amplified signal voltage to a gate trigger circuit, consisting of diodes, 42 and 44, uni-junction transistor, 48, voltage dividing resistors, 47 and 49, switching transistor, 54, and pulse transformer, 53. This gate trigger circuit is not to be restrictive to the named components, as it will be recognized that there are many types of such transistor and silicon controlled rectifier trigger circuits. As the charging rate increases from the amplifier, 38, due to the increased voltage at resistor, 40, and capacitor, 41, the uni-junction transistor, 48, will fire, causing the transistor, 54, to latch in a position to reduce the voltage in the primary of the pulse transformer, 53, thereby causing the silicon controlled rectifier, SCR, or transistor, 58, to turn-off, therefore causing the heater, 64, referring to FIG. 4, to be opened to ground through terminal, 63, through the inductor winding of the commutation device, 60, and through the SCR, 62, to terminal, 63. As the heater requires more power to raise the temperature of the fuel, the opposite occurs; voltage is increased at the pulse transformer primary winding, and SCR, 58, latches to provide a closed circuit from the battery, or alternator/generator, to terminal, 57, through the inductor winding, 60, to terminal, 61, from where the voltage is directed to the heater element, 64, and to ground through terminal, 66. The portion of the circuitry up to and including from the resistor, 40, to the pulse transformer, 53, is known as a gate trigger circuit for SCR's and transistors. The commutation component, 60, is a combined inductive capacitor device to provide turn-off pulses to the SCR's or transistors. The LC network, 60, smooths the switching transients and provides reliability to an otherwise problem of switching these power components. In the two SCR or transistor bridge shown, the switching mode is accomplished by each of the switching components turning-off the other, a conventional use of these components in this type of circuitry. The voltage through the power circuit to the heater, 10, or to the heater resistive element, 64, appears as a variable pulse width wave form, 65. As the requirement for heat decreases, the half wave pulses become thinner with respect to time, and the off periods are therefore lengthened. The opposite occurs when more heat is required. This voltage function will appear smooth to the heater element, and for purposes here can be considered as a proportional control of temperature.

The elctric heater, 10, is used to assist in starting the engine and to partially, if not completely, vaporize the fuel until the exhaust gas heater arrives at a sufficient temperature to substantially heat the fuel. The electrical heater then adds or subtracts incremental power to provide heat to control the ultimate temperature of the fuel within lower and upper limits of temperature as set by the electronic control, potentiometer, 36, and the inherent accuracy of the electronic control circuit. Sufficient heated fuel is available in the combination heater and the line from the heaters to provide for changes of engine condition, such as changes of load and/or speed.

Referring to FIGS. 1 and 2, the heated fuel is then directed to a spring loaded valve, 13, which is similar in construction to that of a relief valve. The spring load will accomplish a resistance to fuel flow with associated pressures in excess of 1 atmosphere, 14.7 pounds per square inch, absolute, and less than a pressure set above one atmosphere, for example, 30 psia, although the latter figure may vary from this value. The purpose of this pressure range is to cancel the effects of manifold vacuum on the spring loaded valve, and to insure that fuel flow will not be a function of vacuum but is soley of pump delivery, 3. As the spring loaded valve, 13, is opened by fuel displacement, the heated fuel, being at its potential distillation point, immediately vaporizes at the outlet hole of the injector tube, 14, which is located within a partial vacuum, 15, and the vaporized fuel immediately and intimately mixes with the incoming air, introduced in the manifold injector, 19, by means of the partial vacuum, 15; the mixture is then drawn into the intake manifold for distribution to the cylinders. The optimum mixture of air and fuel thus enhances improved distribution of the mixture to the combustion chambers of each of the cylinders; hence an optimized combustion occurs.

Figure 3:
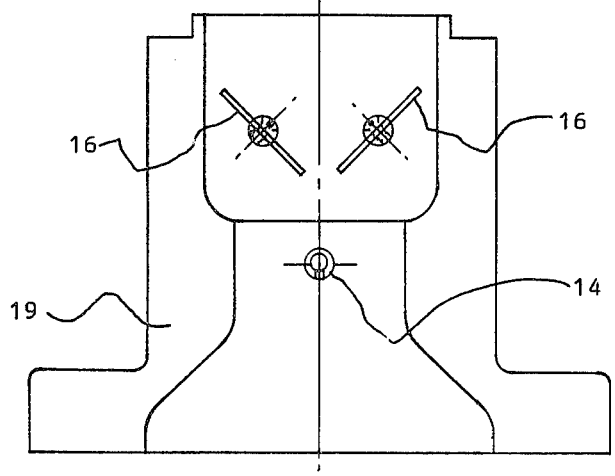
FIG. 3 is a section transverse to the axes of the throttle valves.

The twin throttle valves, 16, arranged on their shafts, again referring to FIGS. 2 and 3, which control the level of partial vacuum below them and hence the volume of intake air through the manifold injector, 19, are actuated by a linkage from the accelerator pedal, 18, through the lever, 32, and the gears, 31, which rotate in opposite direction with respect to each other. The throttle valves, being inter-connected by the gears, provide a symmetry of air flow by the injector tube, 14, and the mixture of air and fuel is thus enhanced as it flows fore and aft through the intake manifold, 15. The axle, or shaft, of one of the throttle valves includes the lever, 32, and a coupling, 33, which connects the rheostat, 17, to the accelerator pedal. The rheostat varies the voltage from the electrical power source through the terminal, 93, to the electric motor, 2, through terminal, 94, to ground.

We claim:

1. An improved fuel system for an internal combustion engine comprising: a manifold injector for the internal combustion engine; an electric motor-driven fuel pump; combination heating chambers including hot gas and electrical heating means for heating fuel from the fuel pump; a first fuel passage coupling said fuel pump to the combination heating chambers; an electrical temperature control means connected to the electrical heating means for heating the fuel in the combination heating chambers; an injector tube mounted in the manifold injector for receiving the heated fuel from the heating chambers, whereupon its release from the injector tube the fuel is vaporized; a second fuel passage coupling the combination heating chambers to the injector tube; air mass flow electric sensing means mounted in the manifold injector; fuel mass flow electric sensing means mounted in at least one of the fuel passages; electronic circuitry coupled to the electric sensing means and to the electric motor-driven fuel pump and responsive to signals from the electric sensing means to control the speed of the fuel pump and thereby to provide a constant air/fuel ratio through the manifold injector; air throttle means disposed in the manifold injector immediately above the injector tube; a shaft mounted in the manifold injector, said throttle means being connected to said shaft; an accelerator control coupled to the shaft for rotation of said throttle means; a rheostat mechanically coupled to said shaft and electrically connected in circuit with said electronic circuitry for providing means for coupling and controlling electric power to said electric motor-driven fuel pump; a first electrical Wheatstone type of bridge included in circuit with said electronic circuitry and electrically connected to said air mass flow electric sensing means, said bridge producing signal voltages as a function of air mass flow in the manifold injector; a second electrical Wheatstone type of bridge included in said electronic circuitry and connected to said electric fuel mass flow sensing means, said second bridge producing signal voltages as a function of fuel mass flow; bridge output signal voltage amplifying means included in said electronic circuitry and preset to obtain a constant air/fuel ratio and adjustable for varying the air/fuel ratios; a power switching speed control circuit for the electric motordriven fuel pump, said amplifier means receiving an algebraic sum of the bridge signal voltages from the first and second bridges, and said amplifier means further producing a rising or falling voltage signal to the power switching circuit, said power switching circuit including switching means for conducting electric power from a voltage source to the electric motor-driven fuel pump or to dump electric power from said electric motor to ground, and said power switching circuit including power transmission means to add to electric power conducted through said rheostat to the electric motor-driven fuel pump.

2. The fuel system set forth in claim 1, and further including electric heat sensing means disposed adjacent to said electrical heating means for sensing fuel temperatures within the fuel passages, said electric heat sensing means being electrically coupled to the electrical temperature control means for maintaining the temperature of the fuel in the heating chambers at a predetermined level.

3. The fuel system defined in claim 1, wherein a spring loaded valve is placed in the second passage immediately before said injector tube, which disperses the heated fuel into the manifold injector, said spring loaded valve cancelling effects of intake manifold vacuum on fuel flow, said spring loaded valve opening to permit passage of heated fuel only by displacement of said electric motor-driven pump when the engine is in a starting or running operative position, said spring loaded valve further serving as a relief valve to bleed excess pressures developed when the engine is not in operation.

4. An improved fuel system for an internal combustion engine comprising: a manifold injector for the internal combustion engine; an electric motor-driven fuel pump; an injector tube mounted in the manifold injector; fuel passage means coupling the fuel pump to the injector tube to supply fuel to the injector tube to be released in a vaporized state from the injector tube into the manifold injector; air mass flow electric sensing means mounted in the manifold injector; fuel mass flow electric sensing means mounted in the fuel passage means; electronic circuitry coupled to the sensing means and to the electric motor-driven fuel pump and responsive to signals from the sensing means to control the speed of the electric motor-driven fuel pump and thereby to provide a constant air/fuel ratio in the manifold injector; air throttle means disposed in the manifold injector immediately above the injector tube; a shaft mounted in the manifold injector for supporting the air throtttle means; manual control means mechanically coupled to said shaft for controlling movements of the air throttle means; a rheostat mechanically coupled to said shaft and electrically connected in circuit with said electronic circuitry for providing means for coupling and controlling electric power to the electric motor-driven fuel pump; a first electric Wheatstone type of bridge included in said electronic circuitry and connected to said air mass flow electric sensing means, said first Wheatstone bridge producing signal voltages as a function of air mass flow in the manifold injector; a second electric Wheatstone type of bridge included in said electronic circuitry connected to said fuel mass flow electric sensing means, said second Wheatstone bridge producing signal voltages as a function of fuel mass flow in said fuel passage means; bridge output signal voltage amplifying means included in said electronic circuitry and preset to obtain a constant air/fuel ratio and adjustable for varying the air/fuel ratios; a power switching speed control circuit for the electric motor-driven fuel pump included in said electronic circuitry, said voltage amplifying means receiving an algebraic sum of the bridge signal voltages from the first and second Wheatstone bridges, and the amplifying means further producing a rising or falling voltage signal to the power switching circuit, said power switching circuit including switching means for conducting electric power from a voltage source to the electric motor-driven fuel pump or to dump electric power from said electric motor to ground, and said power switching circuit including power transmission means to add to electric power conducted through said rheostat to the electric motor.

5. An improved fuel system coupled to the manifold injector of an internal combustion engine comprising: an electric motor driven fuel pump; a combination heating chamber including hot exhaust gas and electrical heating means for heating the fuel from the pump; a first fuel passage coupling the fuel pump to the combination heating chamber; an electric temperature control means connected to the electrical heating means for heating the fuel in the heating chamber; an injector tube mounted in the manifold injector to receive the heated fuel from the heating chamber so as to inject vaporized fuel into the manifold injector; a second fuel passage coupling the heating chamber to the injection tube; air mass flow electric sensor means mounted in the manifold injector; fuel mass flow electric sensing means mounted in at least one of the fuel passages; electronic circuitry coupled to the sensing means and to the electric motor driven fuel pump and responsive to the signals from the sensing means to control the speed of the fuel pump and thereby to provide a constant air/fuel ratio in the manifold injector; a common axle shaft; a dual air throttle means coupled to said common axle shaft to be rotated thereby in the opposite direction so as to provide for symmetry of air flow over the said injector tube; an accelerator pedal, or other manual control, coupled to the common axle shaft for rotation of said dual air throttle means; and a rheostat mechanically coupled to said common axle shaft and connected in circuit with said electronic circuitry for providing means of coupling and controlling electric power to said electric motor driven fuel pump.

6. The fuel system defined in claim 5, and which comprises: a first electrical wheatstone type of bridge included in said electronic circuitry and connected to said air mass flow electric sensing means; said bridge producing signal voltages as a function of air mass flow in the manifold injector.

7. The fuel system defined in claim 6, and which comprises a second electrical wheatstone type of bridge included in said electronic circuitry and connected to said electric fuel mass flow sensing means, said second bridge producing signal voltages as a function of fuel mass flow; the electronic circuit further containing bridge output signal voltage amplifying means preset to obtain a constant air/fuel ratio with an adjustment for varying air/fuel ratios, and said electronic circuitry further containing a power switching speed control circuit for the electric fuel pump motor, said amplifier means receiving an algebraic sum of the bridge signal voltages from the first and second bridges; and the amplifier means further producing a rising or regressing voltage signal to the power switching circuit.

8. The fuel system defined in claim 7, wherein the power switching circuit includes switching means for conducting electrical power from a voltage source to the electric motor driven fuel pump or to dump electric power from said electric motor to ground, and said power switching circuit further includes power transmission means to add to electric power conducted through said rheostat to the electric fuel pump motor.

* * * * *